(12) United States Patent
Nayak et al.

(10) Patent No.: US 11,070,438 B1
(45) Date of Patent: Jul. 20, 2021

(54) APPARATUS, SYSTEM, AND METHOD FOR COLLECTING NETWORK STATISTICS INFORMATION

(71) Applicant: Juniper Networks, Inc., Sunnyvale, CA (US)

(72) Inventors: Manoj Nayak, Bangalore (IN); Rafik Puttur, Dakshina Kannada (IN); Chetana Koushik B N, Bangalore (IN)

(73) Assignee: Juniper Networks, Inc, Sunnyvale, CA (US)

(*) Notice: Subject to any disclaimer, the term of this patent is extended or adjusted under 35 U.S.C. 154(b) by 12 days.

(21) Appl. No.: 16/535,133

(22) Filed: Aug. 8, 2019

(51) Int. Cl.
*H04L 12/26* (2006.01)
*H04L 12/24* (2006.01)
*H04L 29/12* (2006.01)
*H04L 29/08* (2006.01)

(52) U.S. Cl.
CPC ............ *H04L 41/142* (2013.01); *H04L 43/08* (2013.01); *H04L 61/2007* (2013.01); *H04L 67/12* (2013.01)

(58) Field of Classification Search
CPC .............................. H04L 29/06; H04L 43/028
See application file for complete search history.

(56) References Cited

U.S. PATENT DOCUMENTS

| | | | |
|---|---|---|---|
| 2009/0222537 A1* | 9/2009 | Watkins | H04L 29/12311 709/221 |
| 2011/0134761 A1* | 6/2011 | Smith | H04L 43/0852 370/252 |
| 2011/0191451 A1* | 8/2011 | Kuo | G06F 15/177 709/220 |
| 2012/0226804 A1* | 9/2012 | Raja | H04L 43/028 709/224 |
| 2018/0077182 A1* | 3/2018 | Sartran | H04L 63/1425 |

OTHER PUBLICATIONS

Wikipedia, "Link-local address", URL: https://en.wikipedia.org/wiki/Link-local_address, May 12, 2008, 3 pages.

* cited by examiner

*Primary Examiner* — Mansour Oveissi
(74) *Attorney, Agent, or Firm* — FisherBroyles, LLP

(57) ABSTRACT

The disclosed method may include (1) deploying, within a network device, at least one sensor designed to collect network statistics information about a plurality of logical network interfaces of the network device, (2) receiving, at the network device, one or more requests to obtain network statistics information about at least one logical network interface of the network device, (3) determining a range of network addresses that includes a network address of each logical network interface within the one or more requests, and then (4) providing, to the sensor, an instruction that prompts the sensor to (A) simultaneously collect network statistics information about each logical network interface whose network address is within the range of network addresses and (B) utilize the collected network statistics information to enable the network device to handle network traffic. Various other apparatuses, systems, and methods are also disclosed.

20 Claims, 8 Drawing Sheets

Address Table
702

| INTERFACE | GLOBAL IP ADDRESS | LINK-LOCAL ADDRESS |
|---|---|---|
| 608(1) | 10.53.16.1 | 205.3.0.1 |
| 608(2) | 10.53.16.2 | 205.3.0.2 |
| 608(3) | 10.53.16.3 | 205.3.0.3 |
| 608(4) | 5.124.7.1 | 205.3.0.4 |
| 608(5) | 5.124.7.2 | 205.3.0.5 |
| 608(6) | 10.53.16.4 | 205.3.0.6 |
| 608(7) | 10.53.16.5 | 205.3.0.7 |
| 608(8) | 10.53.16.6 | 205.3.0.8 |
| 608(9) | 5.124.7.3 | 205.3.0.9 |
| 608(10) | 5.124.7.4 | 205.3.0.10 |

*FIG. 7*

APPARATUS, SYSTEM, AND METHOD FOR COLLECTING NETWORK STATISTICS INFORMATION

BACKGROUND

The virtualization of network devices may enable large numbers of network interfaces to be implemented within a single host. For example, a software-based router may include hundreds or thousands of logical network interfaces. While these interfaces may efficiently and flexibly handle high volumes of network traffic, large numbers of logical interfaces may generate challenges for organizations and network administrators that wish to monitor and/or troubleshoot the interfaces. For example, network administrators may collect network statistics information (e.g., data about the volume of network traffic handled by one or more interfaces) in order to detect errors or security threats within a network. The burden of collecting this information may grow with the number of interfaces that need to be monitored.

Unfortunately, traditional network-monitoring systems may be unable to meet the demands of individuals and organizations that implement network devices with large numbers of logical interfaces. For example, a conventional technology for collecting network statistics information about logical interfaces may be capable of querying or monitoring only a single interface at a time. Performing multiple queries for network statistics information (and then aggregating and analyzing the returned information) may involve or require prohibitively large amounts of time and/or computing resources.

The instant disclosure, therefore, identifies and addresses a need for improved apparatuses, systems, and methods for collecting network statistics information.

SUMMARY

As will be described in greater detail below, the present disclosure generally relates to apparatuses, systems, and methods for collecting network statistics information. In one example, a computer-implemented method for accomplishing such a task may include (1) deploying, within a network device, at least one sensor designed to collect network statistics information about a plurality of logical network interfaces of the network device, (2) receiving, at the network device, one or more requests to obtain network statistics information about at least one logical network interface of the network device, (3) determining a range of network addresses that includes a network address of each logical network interface within the one or more requests, and then (4) providing, to the sensor, an instruction that prompts the sensor to (A) simultaneously collect network statistics information about each logical network interface whose network address is within the range of network addresses and (B) utilize the collected network statistics information to enable the network device to handle network traffic.

As another example, a system for implementing the above-described method may include various modules stored in memory. The system may also include at least one hardware processor that executes these modules. For example, the system may include (1) a deployment module that deploys, within a network device, at least one sensor designed to collect network statistics information about a plurality of logical network interfaces of the network device, (2) a receiving module that receives, at the network device, one or more requests to obtain network statistics information about at least one logical network interface of the network device, (3) a determination module that determines a range of network addresses that includes a network address of each logical network interface within the one or more requests, and (4) an instruction module that provides, to the sensor, an instruction that prompts the sensor to (A) simultaneously collect network statistics information about each logical network interface whose network address is within the range of network addresses and (B) utilize the collected network statistics information to enable the network device to handle network traffic.

As a further example, a non-transitory computer-readable medium may include one or more computer-readable instructions that, when executed by at least one processor of a computing device, cause the computing device to (1) deploy, within a network device, at least one sensor designed to collect network statistics information about a plurality of logical network interfaces of the network device, (2) receive, at the network device, one or more requests to obtain network statistics information about at least one logical network interface of the network device, (3) determine a range of network addresses that includes a network address of each logical network interface within the one or more requests, and then (4) provide, to the sensor, an instruction that prompts the sensor to (A) simultaneously collect network statistics information about each logical network interface whose network address is within the range of network addresses and (B) utilize the collected network statistics information to enable the network device to handle network traffic.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 7 is an illustration of exemplary network addresses of a group of logical network interfaces.

Figure 1:
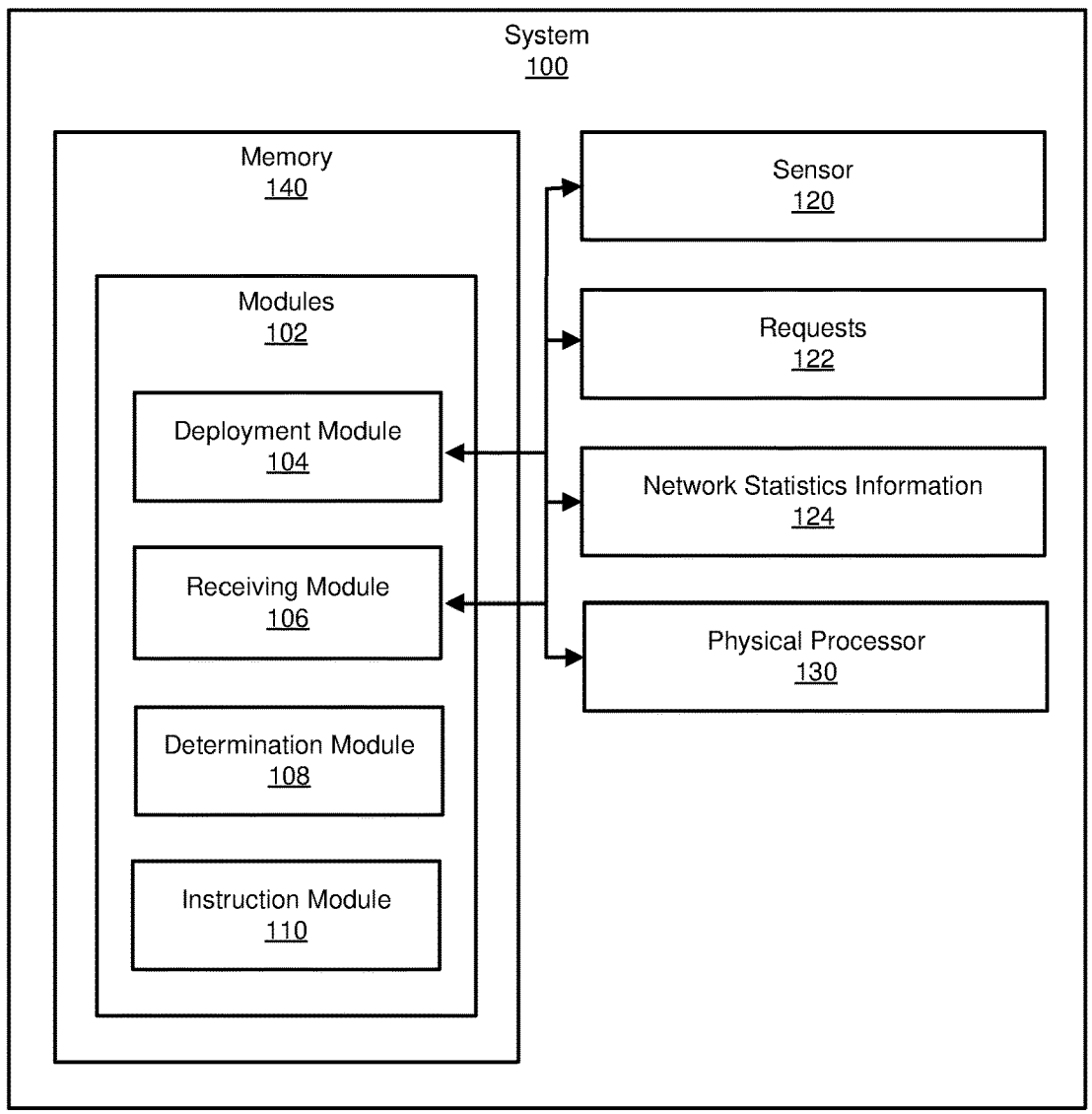
FIG. 1 is a block diagram of an exemplary system for collecting network statistics information.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure describes various systems and methods for collecting network statistics information. As will be explained in greater detail below, embodiments of the present disclosure may obtain, at a single point in time, data describing the network activity of multiple logical network interfaces. To accomplish this task, a network-monitoring system may aggregate multiple requests to monitor one or a small number of network interfaces. For example, rather than fulfilling these requests individually as they are received (as may be performed by traditional networking-monitoring systems), the disclosed network-monitoring systems may fulfill the requests simultaneously. Specifically, these network-monitoring systems may direct a sensor within a network device to collect network statistics information about a range of network addresses that includes a network address of each interface identified within the requests.

By simultaneously collecting network statistics information about multiple network interfaces, embodiments of the instant disclosure may enable organizations and network administrators to quickly and accurately detect network issues, errors, and/or threats. Moreover, aggregating multiple requests to monitor individual network interfaces may reduce the amount of time, computing resources, and/or bandwidth consumed by traditional network-monitoring systems that utilize sensors capable of monitoring only a single or limited number of network interfaces.

Figure 2:
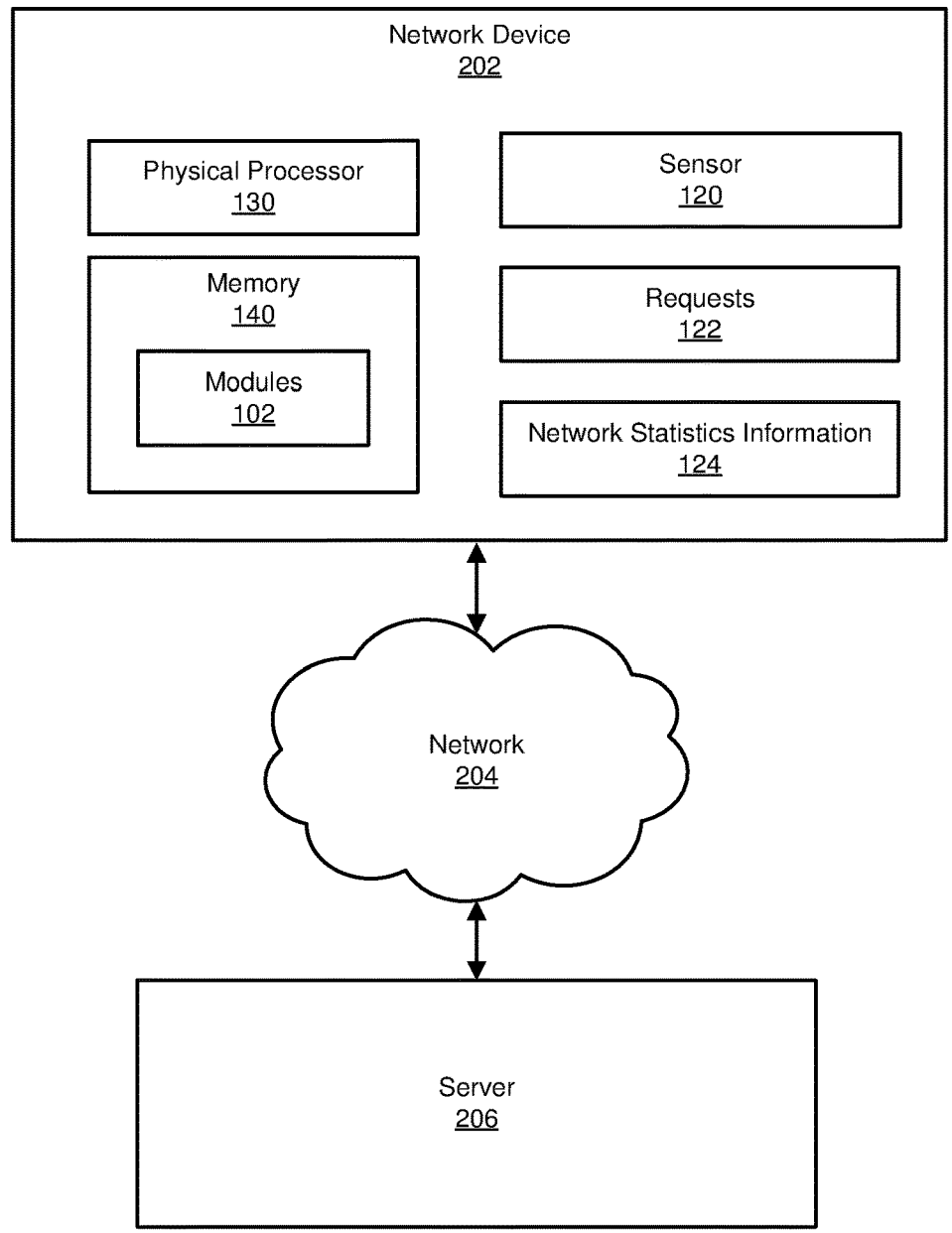
FIG. 2 is a block diagram of an additional exemplary system for collecting network statistics information.
Figure 3:
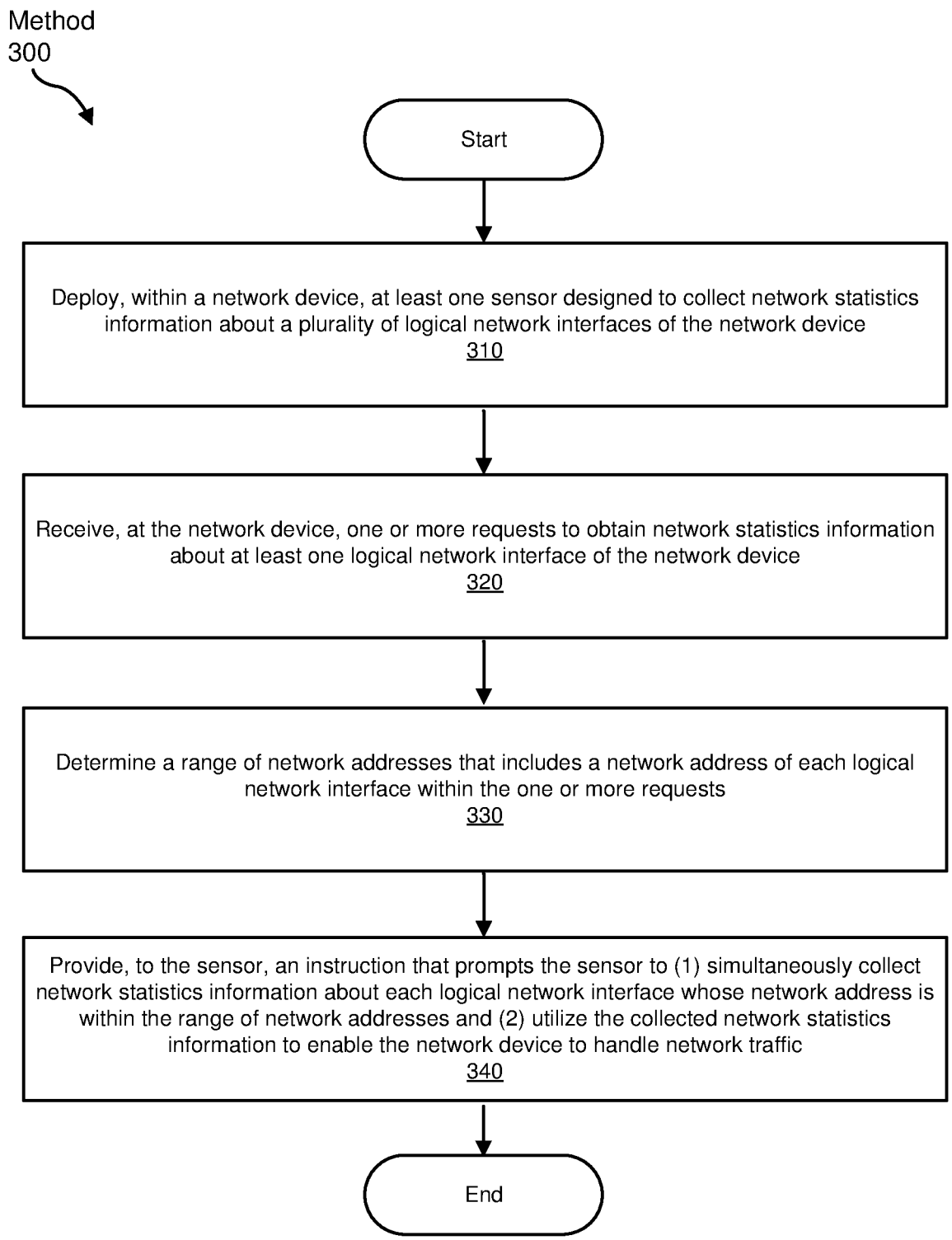
FIG. 3 is a flow diagram of an exemplary method for collecting network statistics information.
Figure 4:
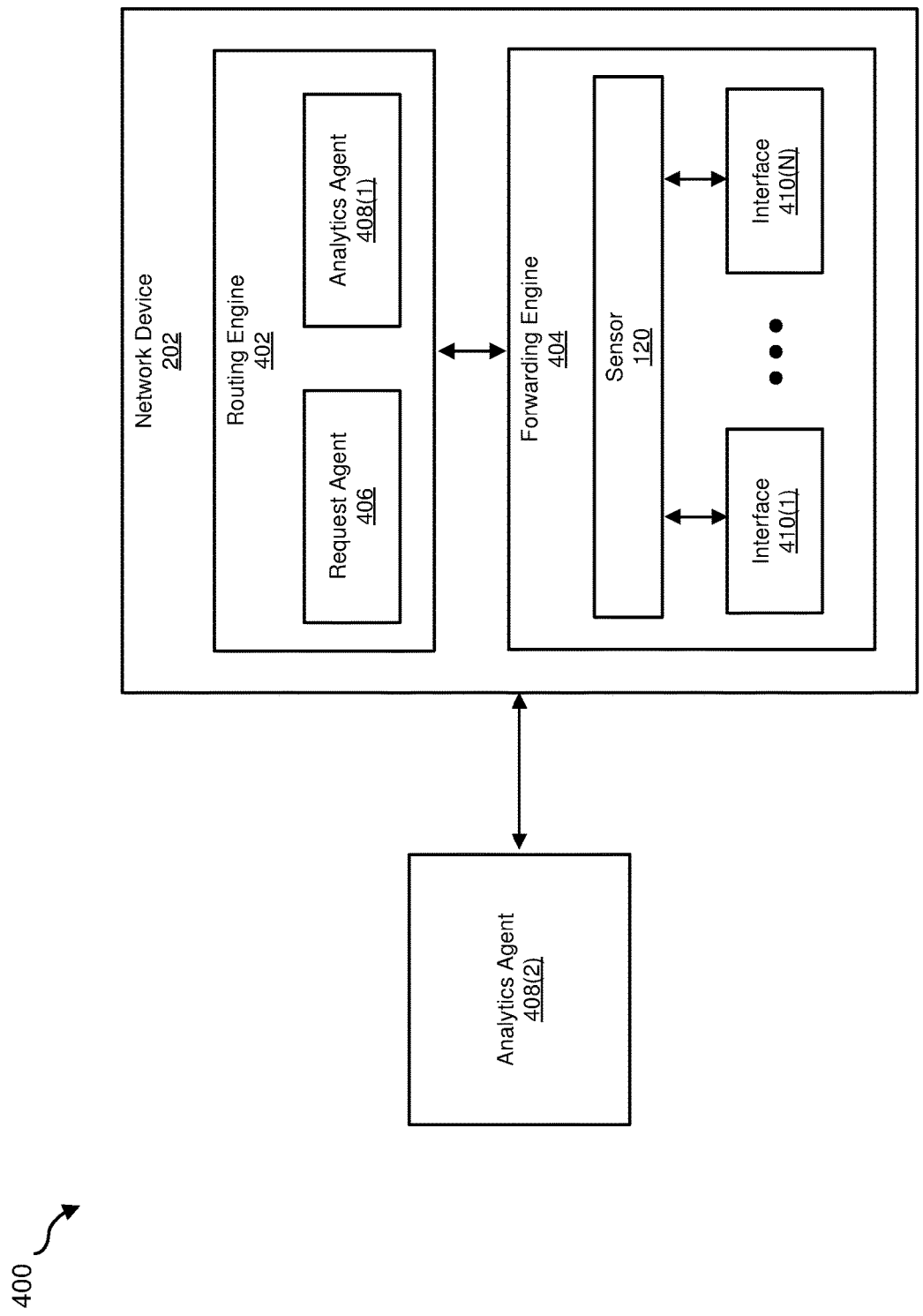
FIG. 4 is a block diagram of an additional exemplary system for collecting network statistics information.

The following will provide, with reference to FIGS. 1, 2, and 4, detailed descriptions of exemplary systems for collecting network statistics information. Detailed descriptions of exemplary requests to obtain network statistics information about one or more logical network interfaces will be provided in connection with FIG. 5. Detailed descriptions of exemplary network devices that include multiple logical network interfaces will be provided in connection with FIG. 6. Detailed descriptions of exemplary network addresses of a group of logical network interfaces will be provided in connection with FIG. 7. Detailed descriptions of corresponding computer-implemented methods will be provided in connection with FIG. 3. In addition, detailed descriptions of an exemplary computing system for carrying out these methods will be provided in connection with FIG. 8.

FIG. 1 is a block diagram of an exemplary system 100 for collecting network statistics information. As illustrated in this figure, exemplary system 100 may include one or more modules 102 for performing one or more tasks. As will be explained in greater detail below, modules 102 may include a deployment module 104, a receiving module 106, a determination module 108, and an instruction module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network device 202 and/or server 206). In addition, one or more of modules 102 may perform any of the functionality described herein in connection with any of the devices illustrated in FIG. 2. One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate collecting network statistics information. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, system 100 may also include one or more sensors, such as a sensor 120. Sensor 120 generally represents any type or form of tool, mechanism, module, and/or agent that gathers, collects, and/or obtains information about the network activity of a computing device. Sensor 120 may be implemented within software and/or hardware of the computing device. For example, sensor 120 may be at least partially implemented via a set of computer-executable instructions.

Sensor 120 may continuously or periodically collect information within a computing device. In one example, sensor 120 may collect information in response to one or more requests, such as requests 122 shown in FIG. 1. Requests 122 generally represent any type or form of messages that direct a computing device to collect information about one or more network interfaces of the computing device. In some examples, requests 122 may be generated by a client (such as a customer, individual, organization, enterprise, tenant, or application) that utilizes the computing device in which sensor 120 is implemented. Requests 122 may be sent simultaneously (e.g., in a single batch) or at various points in time.

Sensor 120 may be deployed within a variety of types of computing devices. In some examples, sensor 120 may be deployed within a network device (such as a router, switch, hub, modem, bridge, repeater, gateway, multiplexer, network adapter, network interface card, server, etc.). In these examples, sensor 120 may be designed to collect network statistics information, such as network statistics information 124 shown in FIG. 1. Network statistics information 124 generally represents any type or form of data describing the network activity of a network device, such as the volume or rate of network traffic handled by one or more network interfaces, the status of one or more network interfaces, network connections accessed by one or more network interfaces, etc.

The term "network interface," as used herein, generally refers to any type or form of connection between a network and a network device. Examples of network interfaces include, without limitation, network ports, network sockets, and network interface controllers. In some examples, a network interface may be implemented partially or solely within hardware. For example, a network interface may represent and/or include a portion of a physical network interface card. In other examples, a network interface may be implemented partially or solely within software. Such software-based interfaces may be referred to as logical network interfaces.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network device 202 in communication with a server 206 via a network 204. In one example, all or a portion of the functionality of modules 102 may be performed by network device 202, server 206, and/or any other suitable computing system. As will be described in greater detail below, one or more of modules 102 from FIG. 1 may, when executed by at least one processor of network device 202, enable sensor 120 to obtain network statistics information about network traffic handled by network device 202.

Network device 202 generally represents any type or form of computing device that facilitates communication within a network and/or across networks. In some examples, network device 202 may include and/or represent a physical computing device. In other examples, network device 202 may include and/or represent a virtual (e.g., software-based) network device that is hosted by one or more physical computing devices. In one embodiment, network device 202 may represent a router (such as a customer edge router, a provider edge router, a hub router, a spoke router, an autonomous system boundary router, and/or an area border router). Additional examples of network device 202 include, without limitation, switches, hubs, modems, bridges, repeaters, gateways, multiplexers, network adapters, network interfaces, servers, portions of one or more of the same, combinations or variations of one or more of the same, and/or any other suitable network nodes.

Server 206 generally represents any type or form of computing device that stores, analyzes, and/or processes data. In some examples, server 206 may process network statistics information 124. In one embodiment, server 206 may be included within network device 202. For example, server 206 may represent a portion of memory and/or processing unit that resides within network device 202. In other examples, server 206 may represent a remote server in communication with network device 202 via network 204.

Network 204 generally represents any medium or architecture capable of facilitating communication or data transfer. In one example, network 204 may facilitate communication between network device 202 and server 206. Network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), an MPLS network, a resource RSVP-TE network, portions of one or more of the same, variations or combinations of one or more of the same, and/or any other suitable network. Although illustrated as being external to network 204 in FIG. 2, network device 202 and server 206 may each represent a portion of network 204 and/or be included in network 204.

FIG. 3 is a flow diagram of an example computer-implemented method 300 for discovering network paths. The steps shown in FIG. 3 may be performed by any suitable computer-executable code and/or computing system, including system 100 in FIG. 1, system 200 in FIG. 2, and/or system 400 in FIG. 4. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may deploy, within a network device, at least one sensor designed to collect network statistics information about a plurality of logical network interfaces of the network device. For example, deployment module 104 may, as part of network device 202 in FIG. 2, deploy sensor 120 within network device 202 to collect network statistics information 124. In this example, deployment module 104 may be implemented within a routing engine of network device 202 and/or a forwarding engine of network device 202.

The systems described herein may perform step 310 in a variety of ways and/or contexts. In some examples, deployment module 104 may deploy sensor 120 within network device 202 by storing and/or installing a software program within network device 202. This software program may execute instructions that facilitate monitoring network activity of the logical network interfaces of network device 202. For example, the software program may be designed to detect and/or inspect network traffic received and transmitted by the logical network interfaces. Additionally or alternatively, the software program may be designed to perform a "netstat" command or similar command that gathers network statistics information. In further examples, deployment module 104 may implement sensor 120 at least partially within the hardware and/or firmware of network device 202.

Deployment module 104 may configure sensor 120 to collect a variety of types of network statistics information. For example, sensor 120 may detect and record information about particular applications that utilize the logical network interfaces of network device 202, a destination and/or origin of network traffic handled by the logical network interfaces, and/or a rate or volume of network traffic handled by the logical network interfaces. In addition, deployment module 104 may configure sensor 120 to be capable of exporting collected network statistics information (e.g., to a remote server for analysis).

Deployment module 104 may deploy sensor 120 within network device 202 at any point while and/or after network device 202 is manufactured and/or configured. In one example, deployment module 104 may deploy sensor 120 in response to a request from a client (e.g., a customer, individual, organization, enterprise, tenant, or application) that utilizes network device 202. In some embodiments, deployment module 104 may tailor sensor 120 based on particular network-monitoring services requested by the client.

FIG. 4 illustrates a system 400 that shows an exemplary configuration of sensor 120 within network device 202. In this example, deployment module 104 may deploy sensor 120 within a forwarding engine 404 of network device 202. In this way, sensor 120 may monitor all or a portion of the logical network interfaces (such as interfaces 410(1)-410(N)) that reside within forwarding engine 404. In the example of FIG. 4, sensor 120 may monitor each logical network interface hosted by network device 202. In other examples, sensor 120 may monitor a certain portion or range of the logical network interfaces hosted by network device 202. In some embodiments, deployment module 104 may deploy one or more additional sensors within network device 202.

Returning to FIG. 3, at step 320 one or more of the systems described herein may receive, at the network device, one or more requests to obtain network statistics information about at least one logical network interface of the network device. For example, receiving module 106 may, as part of network device 202 in FIG. 2, receive requests 122 to collect network statistics information 124.

The systems described herein may perform step 320 in a variety of ways and/or contexts. In some examples, receiving module 106 may periodically or continuously monitor requests received at network device 202. For example, receiving module 106 may be part of and/or controlled by a routing process that receives all or a portion of the network traffic directed to network device 202. As shown in FIG. 4, receiving module 106 may be implemented within a request agent 406 that resides within a routing engine 402 of network device 202. Receiving module 106 may be implemented within any additional or alternative portion of network device 202.

A request to obtain network statistics information may contain various types of information. For example, a request may include an origin of the request (e.g., a client, a computing device, and/or an IP address that generated the request). A request may also indicate a particular type of network statistics information that is to be obtained (e.g., information about the volume of network traffic handled by a logical network interface, information about an application that utilizes a logical network interface, etc.). In addition, a request may identify one or more logical network interfaces for which network statistics information is to be obtained. For example, a request may include an interface index of one or more logical network interfaces.

The term "interface index," as used herein, generally refers to any number, name, and/or sequence that uniquely identifies a logical network interface within a group of logical network interfaces. In some examples, a network device may assign a unique interface index to each logical network interface within a particular network segment (e.g., a subnetwork or local network) and/or within a particular network device. For example, when configuring and/or initializing logical network interfaces, a network device may assign each logical network interface a unique interface index within a particular range (e.g., 0 to 64000).

Figure 5:
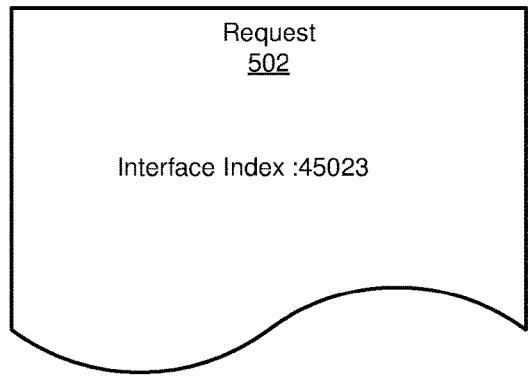
FIG. 5 is an illustration of exemplary requests to obtain network statistics information about one or more logical network interfaces.
Figure 5:
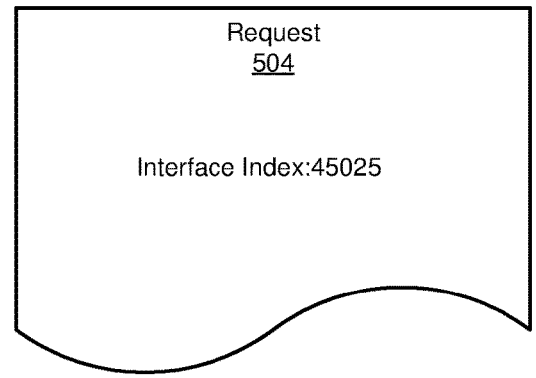
Figure 5:
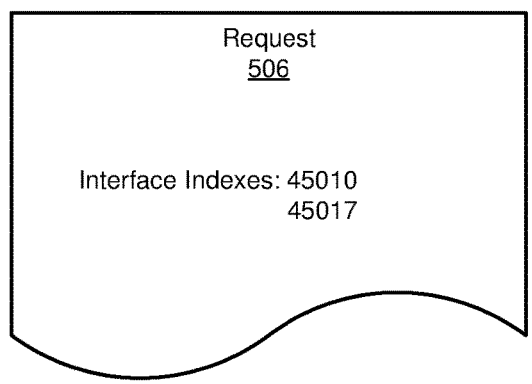
Figure 5:
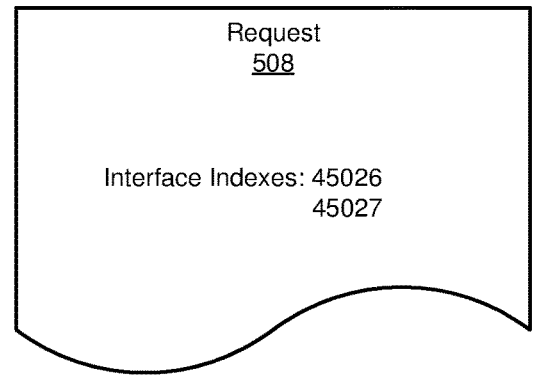

FIG. 5 illustrates exemplary requests 502, 504, 506, and 508. In this example, each request may include one or more different interface indexes. These requests may contain any additional information not shown in FIG. 5, such as a client that generated the request, a network segment in which the corresponding logical network interface resides, and/or a physical computing device that hosts the corresponding logical network interface.

In some embodiments, receiving module 106 may receive each of requests 502, 504, 506, and 508 at a single point in time. For example, a client may distribute the requests simultaneously. In other embodiments, receiving module 106 may receive the requests at various points in time. For example, receiving module 106 may receive request 504 one minute after receiving request 502 and five minutes before receiving request 506. In some examples, receiving module 106 may determine that requests 502, 504, 506, and 508 were received within a certain time interval. For example, receiving module 106 may monitor requests directed to network device 202 for a certain amount of time (e.g., one minute, ten minutes, one hour, etc.). Once the amount of time has lapsed (or a certain number of requests have been received), receiving module 106 may group each interface index within the requests into a single batch. In this way, the disclosed systems may simultaneously obtain network statistics information about each interface index within the requests.

Furthermore, in some embodiments, receiving module 106 may separate and/or organize certain interface indexes into multiple batches (even if the requests identifying the interface indexes were received within the same time period). For example, receiving module 106 may assign an interface index to a particular batch based on factors such as the client that requested to obtain information about the interface index, a value of the interface index, and/or a physical computing device that hosts the logical network interface corresponding to the interface index.

Returning to FIG. 3, at step 330 one or more of the systems described herein may determine a range of network addresses that includes a network address of each logical network interface within the one or more requests. For example, determination module 108 may, as part of network device 202 in FIG. 2, determine a range of network addresses that includes a network address of each logical network interface within requests 122. In this example, determination module 108 may be implemented within the routing engine of network device 202 and/or the forwarding engine of network device 202.

The systems described herein may perform step 330 in a variety of ways and/or contexts. In some examples, determination module 108 may determine a network address of all or a portion of the logical network interfaces identified within the requests received by receiving module 106 (e.g., requests 502, 504, 506, and 508 in FIG. 5). Determination module 108 may identify the network address of a logical network interface in various ways, such as based on information within a request and/or by searching a table or database within network device 202 that stores the network address of the logical network interface. Determination module 108 may then determine a numerical range that includes the value of each identified network address.

The term "network address," as used herein, generally refers to any type or form of information that uniquely identifies a logical network interface (e.g., within a group of logical network interfaces) and/or facilitates communication with the logical network interface. Examples of network addresses include, without limitation, global internet protocol (IP) addresses, local IP addresses, static IP addresses, dynamic IP addresses, link-local addresses, media access control (MAC) addresses, and the like. In some examples, a network address of a logical network interface may be distinct from the interface index of the logical network interface (although one or more types of network addresses may be generated based at least in part on an interface index).

In some embodiments, a logical network interface may be associated with multiple network addresses. For example, when setting up a logical network interface, a network device may assign the logical network interface a global IP address. This global IP address may facilitate communication with network resources external to the network device and/or the network segment (e.g., the subnetwork and/or local network) in which the logical network interface resides. In some embodiments, the network device may generate the global IP address by appending the interface index of the logical network device to a prefix associated with the network segment. Because the interface indexes of all or a portion of the logical network interfaces of a network device may be within a certain range (as discussed in connection with step 320), the global IP address of each logical network interface within the network segment may also be within a similar and/or related range.

In addition to a global IP address, a network device may assign a link-local address to a logical network interface. This link-local address may facilitate communication with network resources that reside within the same network segment as the logical network interface. In some embodiments, the network device may generate the link-local address based at least in part on the interface index and/or the MAC address of the logical network interface. For example, the interface indexes of a group of logical network interfaces may have a one-to-one mapping with the MAC addresses of the logical network interfaces. In other words, each MAC address within the group may be unique, and each MAC address may correspond to and/or be related to the interface index of one of the logical network interfaces. Accordingly, in some examples, the MAC addresses of the group of logical network interfaces may be sequential and/or related.

In one embodiment, a network device may generate a link-local address for a logical network interface by altering and/or transforming the MAC address of the logical network interface. For example, the network device may generate the link-local address by adding certain sequences to the MAC address, inserting certain sequences into the MAC address, inverting certain bits of the MAC address, and/or swapping certain bits of the MAC address. Accordingly, a group of logical network interfaces whose MAC addresses fall within a certain range may have link-local addresses that fall within a similar and/or related range.

In some embodiments, the MAC address of a logical network interface may be defined by and/or associated with the physical computing device that hosts the logical network interface. As such, the link-local addresses of all or a portion of the logical network interfaces hosted by a certain physical computing device may be sequential and/or related. However, the physical computing device may host more than one network segment. Because global IP addresses include a prefix associated with a network segment, the global IP addresses of the logical network interfaces of the certain physical computing device may fall within multiple ranges (e.g., distinct ranges that do not overlap).

Figure 6:
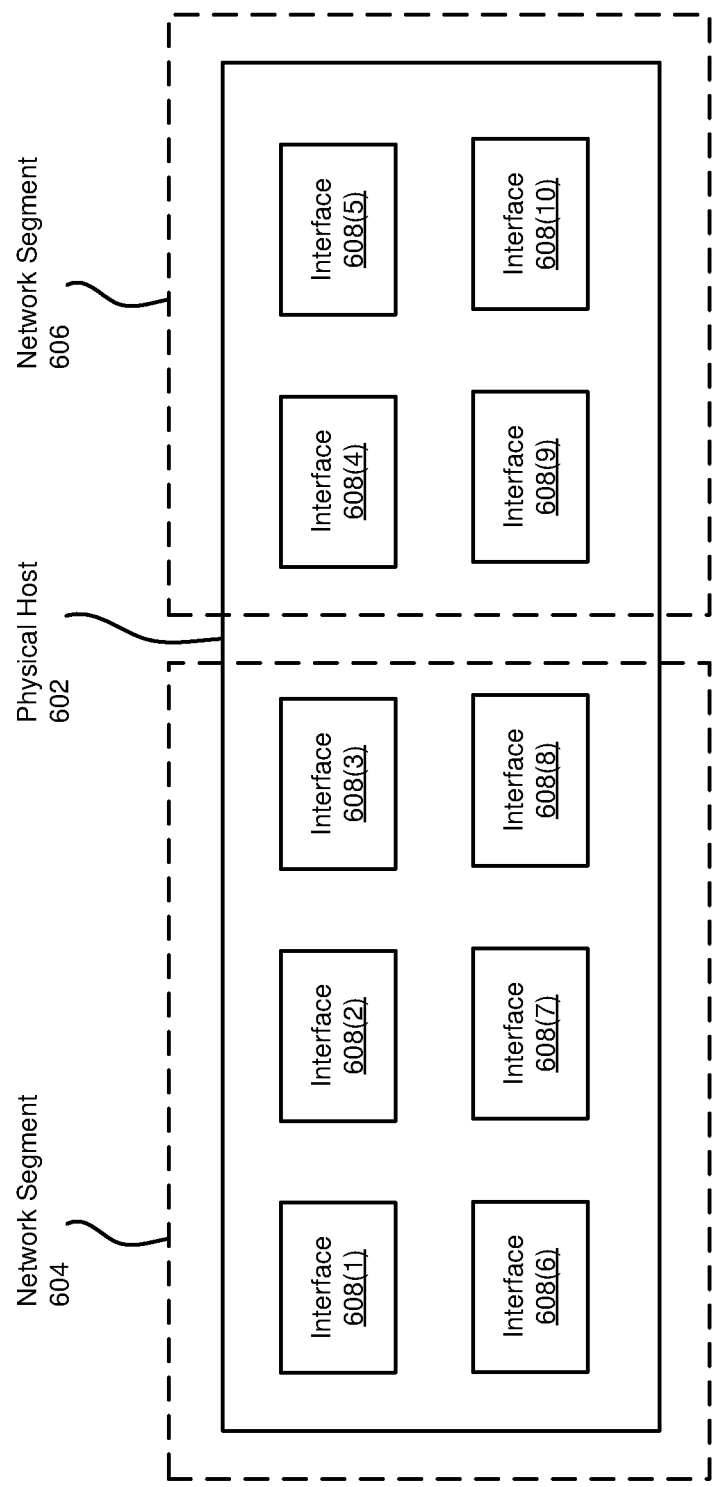
FIG. 6 is an illustration of an exemplary network device that includes multiple logical network interfaces.

FIG. 6 illustrates an exemplary configuration of a physical computing device that hosts multiple network segments. As shown in FIG. 6, a physical host 602 may host a network segment 604 and a network segment 606. In this example, physical host 602 may correspond to all or a portion of network device 202. In some embodiments, physical host 602 may host multiple logical network interfaces, including interfaces 608(1)-608(10). In one example, network segment 604 may include interfaces 608(1)-608(3) and 608(6)-608(8). In addition, network segment 606 may include interfaces 608(4), 608(5), 608(9), and 608(10). Because interfaces 608(1)-608(10) are hosted on the same physical computing device, the link-local addresses of these interfaces may be within a certain range (e.g., a sequential range). However, the global IP addresses of the interfaces that reside within network segment 604 may be within a different range than the global IP addresses of the interfaces that reside within network segment 606.

FIG. 7 illustrates an address table 702 that lists exemplary global IP addresses and link-local addresses of the interfaces shown in FIG. 6. As shown in FIG. 7, the link-local addresses of each of interfaces 608(1)-608(10) may fall within a single sequential range (e.g., 205.3.0.1-205.3.0.10). In addition, the global IP addresses of the interfaces within network segment 604 may fall within one sequential range (e.g., 10.53.16.1-10.53.16.6), while the global IP addresses of the interfaces within network segment 606 may fall within a different sequential range (e.g., 5.124.7.1-5.124.7.4).

In some examples, determination module 108 may determine whether to identify a range of global IP addresses or a range of link-local addresses for a group of logical network interfaces. For example, determination module 108 may determine to identify a range of global IP addresses in response to determining that each logical network interface resides within the same network segment. In contrast, determination module 108 may determine to identify a range of link-local addresses in response to determining that each logical network interface resides within the same physical host and/or that at least two logical network interfaces reside within different network segments. Additionally or alternatively, determination module 108 may determine whether to identify a range of global IP addresses or a range of link-local addresses by identifying the global IP address and link-local address of each logical network interface and then determining whether one set of network addresses includes sequential and/or related addresses.

As an example, determination module 108 may determine that the interface indexes within requests 502, 504, 506, and 508 within FIG. 5 correspond to interfaces 608(1)-608(6) within FIG. 6. Because these interfaces are hosted within different network segments, determination module 108 may identify a range of link-local addresses that includes the link-local address of each interface. As illustrated in FIG. 7, this range may correspond to link-local addresses 205.3.0.1-205.3.0.4. As another example, determination module 108 may determine that the interface indexes within requests 502, 504, 506, and 508 correspond to interfaces 608(1)-608(3) and 608(6)-608(8) within FIG. 6. Because these interfaces all reside within network segment 604, determination module 108 may identify a range of global IP addresses that includes the global IP address of each interface. As illustrated in FIG. 7, this range may correspond to global IP addresses 10.53.16.1-10.53.6.6.

In some examples, determination module 108 may determine the smallest possible range of network addresses that includes the network address of each logical network interface for which to obtain network statistics information. For example, determination module 108 may identify the network address with the lowest value and the network address with the highest value and then set the range to include each network address between those two values. In other examples, determination module 108 may identify a larger subset of network addresses. For example, determination module 108 may determine that the network addresses for which to obtain network statistics information can be described by the format 10.53.16.X, where the value of "X" within each network address differs. In this example, determination module 108 may set the range to be any network address that can be described by that format (e.g., 10.53.16.0-10.53.16.255). As will be explained in greater detail below, identifying these types of ranges may facilitate efficiently monitoring large numbers of logical network interfaces.

Furthermore, determination module 108 may determine that one or more network addresses for which a client has requested information are not sequential. In other words, one or more network addresses within a range of network addresses may not be relevant to the requests sent by the client. In some examples, the disclosed systems may proceed with obtaining network statistics information about the entire range of network addresses (and then parse the network statistics information for relevant data). In other examples, determination module 108 may divide such a range of network addresses into two or more smaller ranges. For example, in the event that a network address range includes more than a certain number (e.g., 50, 100, etc.) of sequential network addresses that are irrelevant to a client's requests, determination module 108 may separate the network address range into multiple ranges such that the irrelevant network addresses are not monitored. In this way, the disclosed systems may balance the time and computing resources involved in providing multiple instructions to sensor 120 with the time and computing resources involved in analyzing large amounts of network statistics information.

Returning to FIG. 3, at step 340 one or more of the systems described herein may provide, to the sensor, an instruction that prompts the sensor to (1) simultaneously collect network statistics information about each logical network interface whose network address is within the range of network addresses and (2) utilize the collected network statistics information to enable the network device to handle network traffic. For example, instruction module 110 may, as part of network device 202 in FIG. 2, provide, to sensor 120, an instruction that prompts sensor 120 to collect network statistics information 124 and utilize network statistics information 124 to enable network device 202 to handle network traffic. In this example, determination module 108 may be implemented within the routing engine of network device 202 and/or the forwarding engine of network device 202.

The systems described herein may perform step 340 in a variety of ways and/or contexts. In some examples, instruction module 110 may send, to sensor 120, a message that includes a range of network addresses. This message may also direct sensor 120 to query and/or monitor each network address within the range to obtain network statistics information 124. In one embodiment, the message may represent and/or include a regular expression (e.g., a sequence or string that describes a search operation). As an example, instruction module 110 may generate and send a regular expression that identifies a range of network addresses using a sequence such as "10.53.16.X" (as discussed in connection with step 330). Instruction module 110 may provide any additional or alternative type of instruction. In addition, instruction module 110 may provide the instruction via any suitable portion or component of network device 202 (such as request agent 406 of routing engine 402, a kernel of routing engine 402, and/or an instruction agent within sensor 120).

In some embodiments, instruction module 110 may direct sensor 120 to record network statistics information about individual logical network interfaces. For example, while sensor 120 may simultaneously obtain network statistics information about multiple logical network interfaces, sensor 120 may record specific pieces of information in connection with the corresponding logical network interfaces. In other embodiments, instruction module 110 may direct sensor 120 to aggregate and/or group all of the collected network statistics information (e.g., without indicating pieces of information that are relevant to individual logical network interfaces).

Sensor 120 may perform a variety of actions after collecting network statistics information 124. In some examples, sensor 120 may send network statistics information 124 to an analytics agent dedicated to storing, parsing, aggregating, and/or otherwise processing network statistics information. In one embodiment, this analytics agent may reside within network device 202. For example, as shown in FIG. 4, routing engine 402 may include an analytics agent 408(1). Analytics agent 408(1) may process network statistics information 124 in a variety of ways, including by identifying information associated with particular network interfaces identified within requests from a client and/or re-formatting network statistics information 124 such that it may be read and/or understood by an application or user. In some examples, analytics agent 408(1) may export the formatted network statistics information to the client that requested network statistics information 124.

In some embodiments, sensor 120 may export network statistics information 124 directly to the client that requested network statistics information 124. For example, as shown in FIG. 4, network device 202 may be in communication with an analytics agent 408(2) that is external to and/or remote from network device 202. In some embodiments, analytics agent 408(2) may be managed and/or operated by the client. In these embodiments, analytics agent 408(2) may store, parse, aggregate, and/or otherwise process network statistics information 124 in accordance with instructions from the client.

Network statistics information 124 may be utilized in a variety of ways to facilitate and/or optimize the flow of network traffic within network device 202. In some examples, the disclosed systems may utilize network statistics information 124 to troubleshoot network issues or errors. For example, network statistics information 124 may indicate one or more logical network interfaces that are experiencing unusual and/or problematic network traffic (e.g., due to a malfunction or security breach). In another example, network statistics information 124 may indicate that some logical network interfaces are experiencing a higher volume of network traffic than others. Such information may be used to implement or improve load-balancing operations within network device 202.

In addition, simultaneously collecting network statistics information about large groups of logical network interfaces may enable the disclosed systems to more quickly detect specific network issues than traditional network-monitoring systems. For example, a network administrator may notice an unusually high volume of network traffic within a network segment. Rather than separately querying each individual logical network interface within the network segment to search for a particular interface that is malfunctioning, the network administrator may utilize the disclosed systems to efficiently query all or a portion of the logical network interfaces at once. For example, the disclosed systems may query subsets of several hundred interfaces to quickly eliminate large numbers of functioning interfaces.

Figure 8:
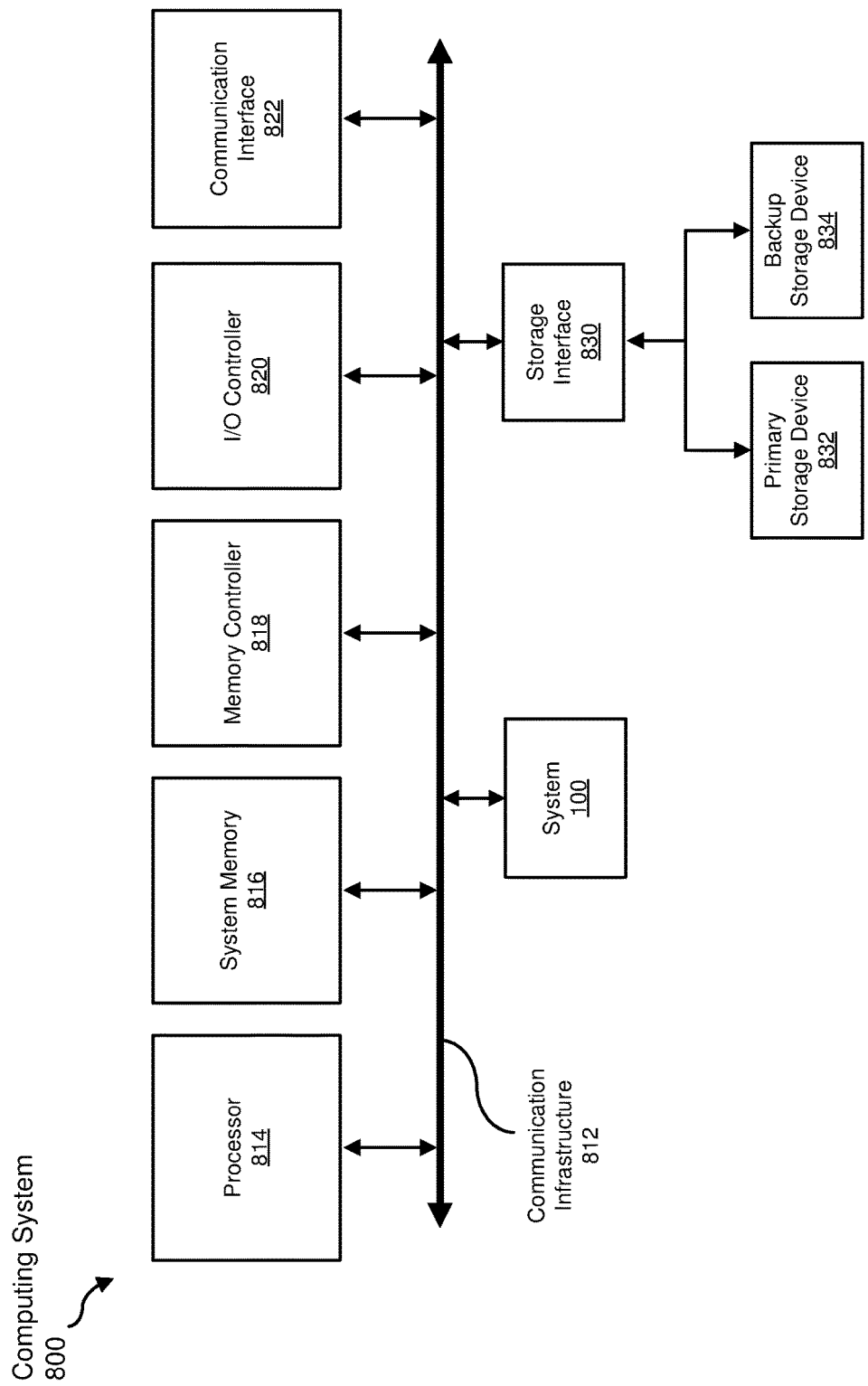
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3 All or a portion of computing system 800 may also perform and/or be a means for performing and/or implementing any other steps, methods, or processes described and/or illustrated herein.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A method comprising:
   implementing, within a network device, at least one sensor designed to collect network statistics information about a plurality of logical network interfaces of the network device;

receiving, at the network device, one or more requests sent by a client to obtain network statistics information about a group of logical network interfaces of the network device;

identifying a set of network addresses assigned to the group of logical network interfaces based at least in part on the one or more requests sent by the client;

determining a first range of network addresses in connection with the set of network addresses by:

identifying a network address with a lowest value within the set of network addresses;

identifying an additional network address with a highest value within the set of network addresses; and setting the first range of network addresses to include each network address between the lowest value and the highest value;

determining, in connection with the set of network addresses, a second range of network addresses that is not sequential with the first range of network addresses; and providing, to the sensor, an instruction that prompts the sensor to:

simultaneously collect network statistics information about each logical network interface whose network address is within the first range of network addresses or the second range of network addresses; and utilize the collected network statistics information to enable the network device to handle network traffic in connection with at least one logical network interface included in the group of logical network interfaces.

2. The method of claim 1, wherein:

implementing the sensor within the network device comprises deploying at least one monitoring agent within a forwarding engine of the network device; and receiving the one or more requests to obtain the network statistics information comprises receiving the one or more requests at a request agent within a routing engine of the network device.

3. The method of claim 1, wherein receiving the one or more requests to obtain the network statistics information comprises receiving a plurality of requests at various points in time, each of the plurality of requests identifying a single logical network interface for which to obtain network statistics information.

4. The method of claim 3, wherein providing the instruction to the sensor comprises providing a single instruction that prompts the sensor to simultaneously collect network statistics information about each logical network interface identified within the plurality of requests.

5. The method of claim 1, wherein determining the range of network addresses comprises determining a range of global internet protocol addresses that includes a global internet protocol address of each logical network interface within the one or more requests.

6. The method of claim 5, further comprising determining the range of global internet protocol addresses in response to determining that each logical network interface within the one or more requests resides within the same network segment.

7. The method of claim 1, wherein determining the range of network addresses comprises determining a range of link-local addresses that includes a link-local address of each logical network interface within the one or more requests.

8. The method of claim 7, further comprising determining the range of link-local addresses in response to determining that each logical network interface within the one or more requests is hosted on the same physical computing device.

9. The method of claim 1, wherein prompting the sensor to utilize the collected network statistics information comprises directing the sensor to forward the collected network statistics information to an analytics agent that processes the collected network statistics information.

10. The method of claim 9, wherein the analytics agent resides within a routing engine of the network device.

11. The method of claim 9, wherein the analytics agent resides within a remote server managed by the client that sent the one or more requests to obtain the network statistics information.

12. A system comprising:

a deployment module, stored in memory, that implements, within a network device, at least one sensor designed to collect network statistics information about a plurality of logical network interfaces of the network device;

a receiving module, stored in memory, that receives, at the network device, one or more requests sent by a client to obtain network statistics information about a group of logical network interfaces of the network device;

a determination module, stored in memory, that:

identifies a set of network addresses assigned to the group of logical network interfaces based at least in part on the one or more requests sent by the client;

determines a first range of network addresses in connection with the set of network addresses by:

identifying network address with a lowest value within the set of network addresses;

identifying an additional network address with a highest value within the set of network addresses;

setting the first range of network addresses to include each network address between the lowest value and the highest value; and determines, in connection with the set of network addresses, a second range of network addresses that is not sequential with the first range of network addresses;

an instruction module, stored in memory, that provides, to the sensor, an instruction that prompts the sensor to:

simultaneously collect network statistics information about each logical network interface whose network address is within the first range of network addresses or the second range of network addresses; and utilize the collected network statistics information to enable the network device to handle network traffic in connection with at least one logical network interface included in the group of logical network interfaces; and at least one physical processor configured to execute the deployment module, the receiving module, the determination module, and the instruction module.

13. The system of claim 12, wherein:

the deployment module deploys at least one monitoring agent within a forwarding engine of the network device; and the receiving module receives the one or more requests at a request agent within a routing engine of the network device.

14. The system of claim 12, wherein the receiving module receives a plurality of requests at various points in time, each of the plurality of requests identifying a single logical network interface for which to obtain network statistics information.

15. The system of claim 14, wherein the instruction module provides, to the sensor, a single instruction that prompts the sensor to simultaneously collect network statistics information about each logical network interface identified within the plurality of requests.

16. The system of claim 12, wherein the determination module determines a range of global internet protocol addresses that includes a global internet protocol address of each logical network interface within the one or more requests.

17. The system of claim 16, wherein the determination module determines the range of global internet protocol addresses in response to determining that each logical network interface within the one or more requests resides within the same network segment.

18. The system of claim 12, wherein the determination module determines a range of link-local addresses that includes a link-local address of each logical network interface within the one or more requests.

19. The system of claim 18, wherein the determination module determines the range of link-local addresses in response to determining that each logical network interface within the one or more requests is hosted on the same physical computing device.

20. A non-transitory computer-readable medium comprising one or more computer-readable instructions that, when executed by at least one processor of a computing device, cause the computing device to:
  implement, within a network device, at least one sensor designed to collect network statistics information about a plurality of logical network interfaces of the network device;
  receive, at the network device, one or more requests sent by a client to obtain network statistics information about a group of logical network interfaces of the network device;
  identify a set of network addresses assigned to the group of logical network interfaces based at least in part on the one or more requests sent by the client;
  determine a first range of network addresses in connection with the set of network addresses by:
    identifying a network address with a lowest value within the set of network addresses;
    identifying an additional network address with a highest value within the set of network addresses; and
    setting the first range of network addresses to include each network address between the lowest value and the highest value;
  determine, in connection with the set of network addresses, a second range of network addresses that is not sequential with the first range of network addresses; and
  provide, to the sensor, an instruction that prompts the sensor to:
    simultaneously collect network statistics information about each logical network interface whose network address is within the first range of network addresses or the second range of network addresses; and
    utilize the collected network statistics information to enable the network device to handle network traffic in connection with at least one logical network interface included in the group of logical network interfaces.

* * * * *